United States Patent

Skala

[11] 4,188,794
[45] Feb. 19, 1980

[54] FREEZER WITH RAPID DEFROSTING

[76] Inventor: Stephen F. Skala, 3839 S. Wenonah Ave., Berwyn, Ill. 60402

[21] Appl. No.: 908,509

[22] Filed: May 22, 1978

Related U.S. Application Data

[63] Continuation-in-part of Ser. No. 792,456, Apr. 29, 1977, abandoned, Ser. No. 576,447, May 12, 1975, abandoned, and Ser. No. 299,214, Oct. 4, 1972, Pat. No. 3,888,303.

[51] Int. Cl.$^2$ .............................................. F25D 21/12
[52] U.S. Cl. ......................................... 62/82; 62/282; 165/17
[58] Field of Search ................... 165/2, 17; 62/82, 282

[56] References Cited

U.S. PATENT DOCUMENTS 3,267,689   8/1966   Liebert ................... 62/277

*Primary Examiner*—Albert W. Davis, Jr.
*Assistant Examiner*—Margaret A. Focarino

[57] ABSTRACT

A food storage compartment of a freezer accumulates frost. At selected times, a heat source of large thermal capacity transforms a retained body of water or ice to steam. The steam condenses upon and melts the frost. A portion of the melt is retained to provide a source of steam in a subsequent defrosting period. The heat source operates at a temperature substantially above the boiling temperature of water and is permanently attached to a concavity or other reservoir which retains the water substance.

In a preferred embodiment, the freezer is part of a system of domestic appliances using a liquid phase thermal exchange fluid to transfer heat between a plurality of appliances and thermal reservoirs maintained at hot and cold temperatures. The retained water substance is ice in a concavity at the bottom of the freezer. During a defrosting period, valves are positioned to allow flow of hot thermal exchange fluid as a heat source adjacent to the concavity. The ice in the concavity rapidly melts and forms steam which melts the frost. The melt flows into the concavity and surplus melt flows into a drain opening above the concavity. When flow of hot thermal exchange fluid stops, freezer temperature returns to sub-freezing and water in the concavity freezes to remain for the next defrosting period.

9 Claims, 1 Drawing Figure

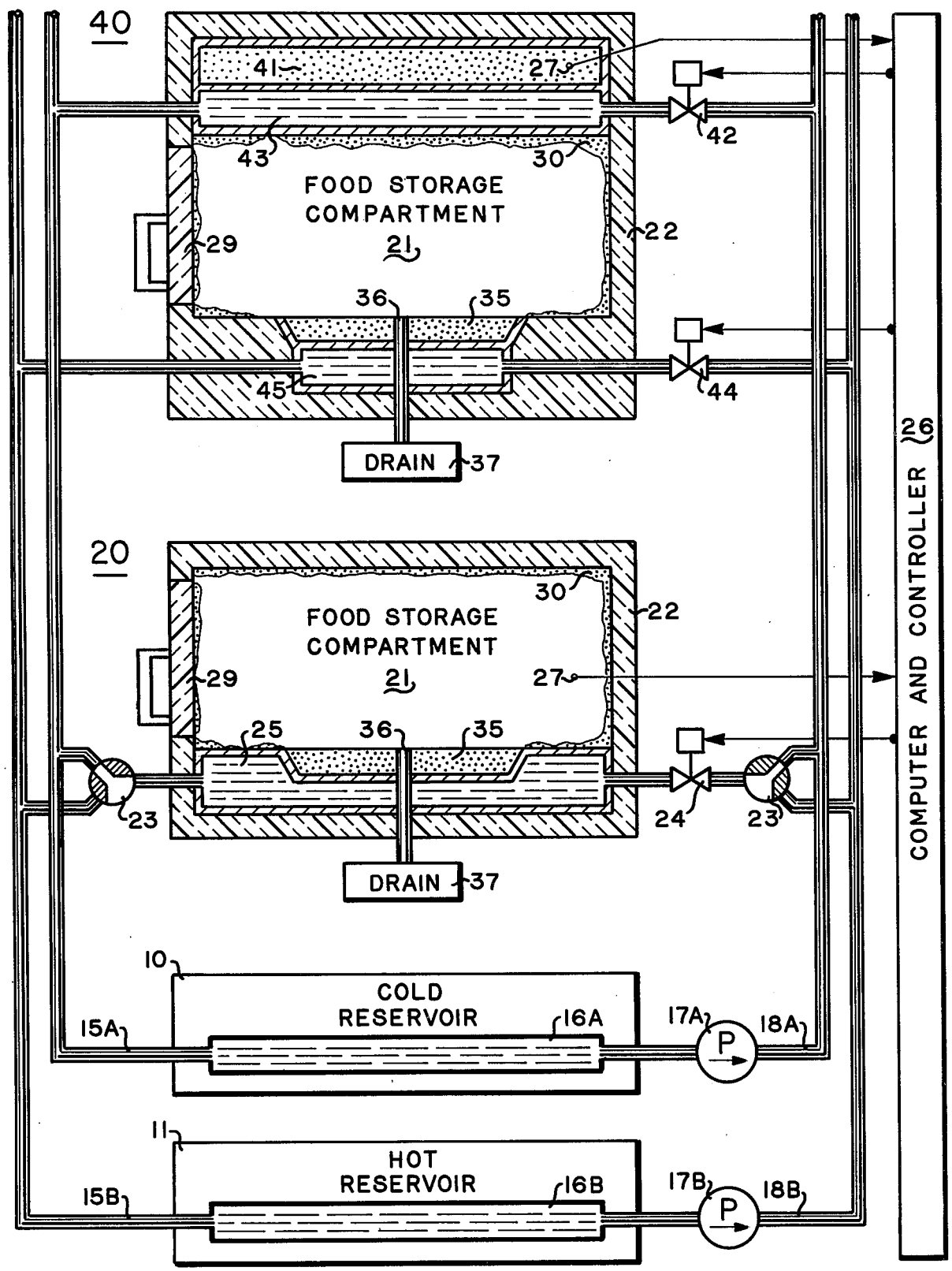

FREEZER WITH RAPID DEFROSTING

BACKGROUND

This application is a continuation-in-part of Ser. No. 299,214 filed Oct. 4, 1972 and now U.S. Pat. No. 3,888,303; and Ser. No. 576,447 filed May 12, 1975, now abandoned; and Ser. No. 792,456 filed Apr. 29, 1977, now abandoned.

CROSS-REFERENCES TO RELATED APPLICATIONS

Ser. No. 577,109 entitled Forced Air Range with Thermal Exchange Fluid and now U.S. Pat. No. 4,024,904.
Ser. No. 839,618 entitled Domestic Appliance System with Thermal Exchange Fluid.
Ser. No. 756,392 entitled Hot Reservoir System for Intermittent Users.
Ser. No. 769,389 entitled Pressure Cooking System with Thermal Exchange Fluid.
Ser. No. 792,455 entitled Oven with Refrigerated Food Storage based on Thermal Exchange Fluid.

This invention relates to a freezer for storing perishable foods which is rapidly defrosted by steam formed in response to flow of a hot thermal exchange fluid.

In its preferred embodiment, this invention and the inventions of the cross-referenced applications are parts of a system of domestic appliances wherein heat is exchanged between thermal reservoirs and appliances by forced circulation of a liquid phase thermal exchange fluid. Included among the thermal reservoirs are a hot reservoir which is maintained at a constant hot oven temperature by a heat storing material having a high heat of crystallization at a high temperature and a cold reservoir which is maintained at a constant sub-freezing temperature by a thermal storing material having a large heat of fusion at a low temperature. Representative temperatures are −20° F. for the cold reservoir and 575° F. for the hot reservoir.

Thermal exchange fluid flows in a fluid circuit which includes a heat exchanger in a thermal reservoir, a pump, and a supply and return main pair in which the thermal exchange fluid can flow under pressure. The appliances connect to the supply and return main pairs. Heating and cooling of an appliance is controlled by selecting and regulating flow of thermal exchange fluid. Since the marginal cost of selector valves and connecting conduits to provide thermal exchange fluid at one or more additional temperature levels is small, a secondary heating or cooling function can economically be added to an appliance. Such secondary functions can provide significant advantages, an example of which includes storage of food in a refrigerated compartment followed by unattended programmed cooking for completion at dinner time on the following day. More general advantages deriving from the system of thermal reservoirs and thermal exchange fluid include large thermal capacity during periods of peak use, economical charging of the hot and cold reservoirs at moderate power levels during off-peak hours, and shared use by a plurality of appliances of the thermal reservoirs which span the range of domestic appliance temperatures.

Conventional domestic refrigerators and freezers are vapor phase systems having a refrigeration means comprising a heat pump with a condensible vapor working fluid, a condenser for transferring heat to ambient air, and an evaporator for absorbing heat from one or more food storage compartments. In frostless systems, the evaporator is separate from the food storage compartments which it cools by forced air convection. Water vapor preferentially deposits as frost on the colder evaporator which is heated periodically for defrosting. In manual defrosting systems, the evaporator is part of the food storage compartment and is subject to frost accumulation. Comparing frostless and manual defrosting systems, the frostless system is more complex and costly, uses more energy for periodic defrosting of the evaporator, increases freezer temperature during defrosting, and tends to dry stored food by lowering compartment humidity. The manual defrosting system requires occasional defrosting of the food storage compartment which is inconvenient and time consuming.

OBJECTS AND SUMMARY

It is a general object of this invention to provide an improved defrosting method and apparatus for a freezer.

It is another object to provide convenient defrosting with minimal drying of food and with reduced use of energy.

It is yet another object to provide a simple and economical freezer which is part of an improved system of domestic appliances having sources of hot and cold thermal exchange fluid.

These and other objects and advantages which will become apparent are attained by the invention wherein frost accumulated in a freezer storage compartment is melted at selected times by steam generated by applying heat to a body of water or ice retained from a previous defrosting period. A heat source of large thermal capacity operating at temperatures substantially above the boiling temperature of water transfers heat effectively to a concavity or other reservoir containing the body of water substance to generate steam rapidly. The steam effectively transfers heat from the concavity to the frost which melts rapidly. A portion of the melt is retained by the concavity for use during the next defrosting period. The concavity and its attached heat source may be separate from the storage compartment with steam and melt communicating therebetween through conduits, but in its most simple and preferred form the concavity is a depression in the bottom portion of the storage compartment. Melt then flows by gravity into the concavity and surplus melt flows into a drain opening above the concavity. For a user of the improved freezer, defrosting comprises removing food from the storage compartment, initiating the defrosting process by such means as depressing a switch to operate a controller, and replacing the food after defrosting is completed. A short defrosting period allows food to be removed and replaced without thawing.

The preferred embodiment, wherein the sources of heat and cold are a liquid thermal exchange fluid which is delivered to the freezer, has the attributes of the system of domestic appliances described in the background. Hot thermal exchange fluid which heats the concavity by flowing through an adjacent enclosed chamber provides the large thermal capacity and high oven temperature of a hot reservoir. Since the heat exchange and valve structures are simple and economical, the large heat capacity and high temperature which result in rapid defrosting are also economical. Cooling is provided by similar economical means. The relatively low cost of each freezer unit allows a plurality of specialized refrigeration units at various locations to provide optimal temperatures and structures in a domestic appliance system.

DESCRIPTION OF THE PREFERRED EMBODIMENT

The drawing shows as diagrammatic side sectional views the improved freezer and it shows as a schematic diagram means to heat, cool, deliver, and control flow of thermal exchange fluid for the freezer.

In the preferred embodiment, thermal inputs to the freezer comprise a thermal exchange fluid which is heated by a hot reservoir and cooled by a cold reservoir. An assembly of thermal reservoirs and related components for exchanging heat with thermal exchange fluid and for its transport to and from domestic appliances is designated by reference numerals 10 through 18. This assembly is described in more detail in cited copending applications Ser. Nos. 756,392 and 839,618. Briefly, cold reservoir 10 preferably comprises the following components, not shown: a thermally insulated vessel containing a substance of low freezing temperature such as a solution of water and ethylene glycol, a refrigeration unit with evaporator immersed in the water solution, and a thermostatically controlled power source to operate the refrigeration unit at off-peak hours to freeze the water solution. Latent heat of fusion of the frozen water solution provides thermal capacity at a constant temperature during periods of use. Hot reservoir 11 preferably comprises the following components, not shown: a thermally insulated vessel containing a substance of high melting temperature such as an alkali hydroxide mixture, a heating element which exchanges heat with the alkali hydroxide mixture, and a thermostatically controlled power source to operate the heating element at off-peak hours to melt the alkali hydroxide mixture. Latent heat of crystallization of the alkali hydroxide mixture provides thermal capacity at a constant temperature during periods of use.

Cold thermal exchange fluid is provided for the freezers at a differential pressure by apparatus which comprises a return main 15A, a heat exchanger 16A in the cold reservoir, a pump 17A, and a supply main 18A. Similarly, hot thermal exchange fluid is provided by a return main 15B, a heat exchanger 16B in the hot reservoir, a pump 17B, and a supply main 18B.

Freezer 20, having a food storage compartment 21 surrounded by thermal insulation 22, is maintained at a constant low temperature by a regulated flow of cold thermal exchange fluid and is defrosted by steam generated in response to a flow of hot thermal exchange fluid. In normal use, selector valves 23 are in the position shown to allow flow of cold thermal exchange fluid through one of the selector valves, through regulator valve 24, through an enclosed chamber 25 which functions as a heat exchanger, and through the other selector valve to return main 15A. A computer and controller 26 is programmed to include temperature set points and responds to temperature information from sensor 27 to provide power which operates the regulator valve 24 thereby modulating flow of the thermal exchange fluid to maintain the food storage compartment temperature at a predetermined programmed set point. As door 29 is opened ambient air enters the food storage compartment and atmospheric water vapor condenses on surfaces at sub-freezing temperatures as frost 30.

When a decision in made to defrost, food is removed from the food storage compartment and selector valves 23 are positioned to admit hot thermal exchange fluid which flows through enclosed chamber 25. Ice within a concavity 35 located at the bottom of the food storage compartment is transformed first to water and then to steam which condenses upon and melts the frost. The melting process is rapid since the hot reservoir stores substantial thermal energy which is effectively transferred by hot thermal exchange fluid and by condensation of steam. Melt flows downward to fill the concavity after which surplus melt flows through protruding pipe 36 to drain 37. After a time sufficient to melt all of the frost, flow of hot thermal exchange fluid is stopped by repositioning the selector valve 23 to the normal cooling position shown. Water within the concavity 35 freezes and remains for a subsequent defrosting time.

Freezer 40 uses a body of thermal storing material to maintain a more constant temperature and to reduce thermal losses from conduits by reducing frequency of flow of cold thermal exchange fluid. Separate enclosed chamber heat exchangers are used for hot and cold thermal exchange fluid. A thermal storing material 41, which may be a water solution with a selected freezing temperature, maintains food storage compartment 21 at a constant temperature. When the thermal storing material is melted and a temperature increase is detected at sensor 27, computer and controller 26 provides power to open regulator valve 42 thereby admitting flow of cold thermal exchange fluid through enclosed chamber 43 for a sufficient time to freeze the thermal storing material which is indicated by a temperature decrease at sensor 27. The defrosting process is similar to that described previously. Regulator valve 44 is opened, hot thermal exchange fluid through enclosed chamber 45, and ice in concavity 35 melts, vaporizes, and condenses on the frost which melts. The melt flows into the concavity and a portion of the melt flows over pipe 36 or other protruding member into drain 37. When the frost is melted, regulator valve 44 is closed.

The system of thermal reservoirs associated with the preferred embodiment has characteristics determined by desired properties of connected appliances such as are cited in the Background. Hot reservoir temperature is approximately 575° F. to provide high temperatures for ovens and ranges. Although practice of this invention requires temperature at the concavity only sufficient to boil water, rapid boiling is desirable to reduce defrosting to a convenient time interval. Thermal exchange fluid temperatures substantially above the boiling temperature of water allow such rapid boiling and further allow the higher thermal impedance of more simple and economical concavity heat exchange structures. Cold temperatures typical for conventional domestic refrigerators are 0° F. for the freezer portion and 37° F. for the refrigerator portion. Commercial food storage systems having a plurality of storage units tend to use a larger range of temperatures more optimal for particular foods which include −12° F. for ice cream and related frozen desserts, 0° F. for most other frozen foods, 28° to 36° F. for fresh meats and vegetables, and 35° to 42° F. for dairy products. Since the present invention provides refrigeration units having a significantly lower marginal cost than conventional vapor phase refrigerators, a plurality of such refrigeration units is used to economically extend domestic refrigeration temperatures to more optimal values to include a low freezer temperature of −12° F. A cold reservoir temperature of approximately −20° F. is sufficient to maintain such low freezer temperature and, with a hot reservoir temperature of 575° F., a thermal exchange fluid is required to function in a liquid phase through a temperature range of −20° F. to 575° F. An example of a suitable thermal exchange fluid is the aromatic hydrocarbon "Therminol 60" manufactured by Monsanto Corporation which includes the following properties: an operating range of −60° F. to 600° F., a pour point of −80° F., a specific heat of approximately 0.5, and a vapor pressure at 600° F. of 760 mm Hg. It has an autoignition temperature of 835° F. and is classified as practically non-toxic based on vapor inhalation and oral and skin absorption studies.

A system of domestic appliances based upon a thermal exchange fluid is not limited to the refrigerator of this invention. Among a plurality of appliances may be included water cooling or ice making units associated with the water source and drain of a kitchen sink or frostless type refrigerators having a heat exchanger cooled by a cold thermal exchange fluid and periodically defrosted by a warm thermal exchange fluid. Such a frostless refrigerator may be adapted for domestic use from the disclosure of R. C. Liebert in U.S. Pat. No. 3,267,689 wherein a plurality of refrigerated store display fixtures are connected to a source of cold and warm thermal exchange fluid. The present invention extends the range of options for convenience and performance in domestic and other refrigeration systems.

Although the preferred embodiment sharing with other appliances sources of hot and cold thermal exchange fluid allows the invention to be practiced economically, the defrosting process and structures apply to alternative thermal input. Distinctive features of the invention are apparent in a comparison to the following hypothetical process for manually defrosting a conventional freezer having an evaporator in thermal contact with the food storage compartment and having a bottom located drain. An electrically heated vessel containing water is connected to a source of electrical power and placed in the compartment. The water boils and steam condenses on the frost which melts and flows through the drain. Although domestic power capacity is normally too limited to provide large quantities of steam for rapid defrosting, industrial users would not be so constrained. Remaining problems would be inconvenience of storing a removable vessel and of transporting water and the vessel to the freezer. The invention obviates such problems by attaching the heating means to the freezer structure and by the step of retaining a portion of the melt in thermal contact with the heating means for subsequent use. The heating means include electric and flame heaters as well as sufficiently hot thermal exchange fluid. Retention of a predetermined quantity of melt in thermal contact with the heating means may be provided by pumps to a concavity and surplus melt may be removed by a pump as well as by preferred gravity means. The concavity may be a reservoir in a fixed location separate from but communicating with the food storage compartment having a drain conduit leading from the compartment to the reservoir to fill the reservoir with the melt, a conduit leading from the reservoir to dispose surplus melt, and a steam duct from the reservoir to the compartment.

What I claim is:

1. A method for rapidly melting frost in a freezer comprising the steps of cooling a compartment to a low temperature below the freezing temperature of water, said compartment having an opening to ambient air whereby water vapor enters to deposit on compartment surfaces as frost, heating a concavity communicating with the compartment and containing a water substance retained from a previous defrosting period substantially above the boiling temperature of water to generate steam, delivering said steam to the compartment where the steam condenses upon the frost to melt the frost thereby forming a melt, delivering at least a portion of the melt to the concavity, retaining a portion of the melt in the concavity for use in a subsequent defrosting period, and stopping heating of said concavity thereby returning compartment temperature to the low temperature.

2. The method of claim 1 wherein the step of heating the concavity comprises heating substantially above the boiling temperature of water a body of liquid thermal exchange fluid separate from the freezer and delivering said body of thermal exchange fluid to and through an enclosed chamber adjacent to the concavity to boil water in the concavity.

3. The method of claim 1 wherein the concavity is located within the compartment, the steam is formed within the compartment, the melt flows by gravity into the concavity, and surplus melt is removed by flowing over a drain opening above the concavity.

4. The method of claim 2 wherein the thermal exchange fluid is heated by flowing through a heat exchanger in a hot reservoir which hot reservoir is maintained at a hot oven temperature.

5. The method of claim 4 wherein the step of cooling the compartment is characterized by cooling thermal exchange fluid within a heat exchanger in a cold reservoir separate from the freezer and delivering the cold thermal exchange fluid into a heat exchanger within the compartment.

6. The method of claim 3 wherein the concavity is heated by steps comprising heating substantially above the boiling temperature of water a body of liquid thermal exchange fluid separate from the freezer and delivering said body of thermal exchange fluid to and through an enclosed chamber adjacent to the concavity to boil water in the concavity.

7. Apparatus for rapidly defrosting a freezer comprising a thermally insulated compartment having means to open the compartment to ambient air thereby admitting atmospheric water vapor, means to cool said compartment to a low temperature below water freezing temperature causing said atmospheric water vapor to condense as frost on surfaces of the compartment, a concavity communicating with the compartment which retains a body of water substance, means attached adjacent to said concavity to apply heat at selected times to increase the concavity temperature substantially above the boiling temperature of water to transform said body of water substance to steam which steam communicates with the compartment to condense on the frost to transform the frost to a melt, means to deliver a portion of the melt to the concavity to provide a body of water substance which is retained in the concavity for use in subsequent defrosting periods, means to remove surplus melt from the compartment, and means to stop applying said heat to the concavity thereby returning the compartment temperature to the low temperature.

8. The apparatus of claim 7 wherein said means to apply heat comprise an enclosed chamber for receiving a body of thermal exchange fluid, means separate from said enclosed chamber to heat said body of thermal exchange fluid to a hot temperature substantially above boiling water temperature, and means to deliver said body of hot thermal exchange fluid to the enclosed chamber.

9. The apparatus of claim 8 wherein said concavity is located at the bottom of the compartment, said melt flows by gravity into the concavity, and said surplus melt flows over a drain opening positioned above the concavity.

* * * * *